US009442208B2

United States Patent
Poole

(10) Patent No.: US 9,442,208 B2
(45) Date of Patent: *Sep. 13, 2016

(54) DEVICE AND METHOD FOR DEGHOSTING VARIABLE DEPTH STREAMER DATA INCLUDING PARTICLE MOTION DATA

(71) Applicant: CGG Services SA, Massy Cedex (FR)

(72) Inventor: Gordon Poole, Crawley (GB)

(73) Assignee: CGG SERVICES SA, Massy (FR)

( * ) Notice: Subject to any disclaimer, the term of this patent is extended or adjusted under 35 U.S.C. 154(b) by 339 days.

This patent is subject to a terminal disclaimer.

(21) Appl. No.: 14/050,161

(22) Filed: Oct. 9, 2013

(65) Prior Publication Data

US 2014/0362658 A1 Dec. 11, 2014

Related U.S. Application Data

(60) Provisional application No. 61/832,452, filed on Jun. 7, 2013.

(51) Int. Cl.
*G01V 1/38* (2006.01)
*G01V 1/28* (2006.01)
*G01V 1/36* (2006.01)

(52) U.S. Cl.
CPC . *G01V 1/36* (2013.01); *G01V 1/38* (2013.01); *G01V 2210/44* (2013.01); *G01V 2210/46* (2013.01); *G01V 2210/51* (2013.01); *G01V 2210/56* (2013.01)

(58) Field of Classification Search
CPC ...... G01V 1/36; G01V 1/38; G01V 2210/44; G01V 2210/46; G01V 2210/51; G01V 2210/56
USPC ..................................................... 367/7, 24
See application file for complete search history.

(56) References Cited

U.S. PATENT DOCUMENTS 4,353,121 A 10/1982 Ray et al.
4,992,992 A 2/1991 Dragoset, Jr.

(Continued)

FOREIGN PATENT DOCUMENTS

WO 2011/154463 A1 12/2011

OTHER PUBLICATIONS

Yan Mei et al., "A Weighted Adaptive Subtraction for Two or More Multiple Models", SEG Denver 2010 Annual Meeting 3490, pp. 3488-3492.

(Continued)

*Primary Examiner* — Daniel L Murphy
(74) *Attorney, Agent, or Firm* — Patent Portfolio Builders PLLC

(57) ABSTRACT

Computing device, computer instructions and method for de-ghosting seismic data related to a subsurface. The method may include receiving input seismic data recorded by seismic receivers that located at different depths ($z_r$), generating migration data (du) and mirror migration data (dd) from the input seismic data, deriving a ghost free model (m) based on simultaneously using the migration data (du) and mirror migration data (dd), generating primary (p) and ghost (g) datasets based on the ghost free model (m), simultaneously adaptively subtracting the primary (p) and ghost (g) datasets from the migration data (du) to provide adapted primary ($p^{i1}$ and $p^{i2}$) and adapted residual ($r^{i1}$ and $r^{i2}$) datasets, and generating a final image (f) of the subsurface based on the adapted primary ($p^{i1}$ and $p^{i2}$) and the adapted residual ($r^{i1}$ and $r^{i2}$) datasets. In certain embodiments, the input seismic data d includes both hydrophone data and particle motion data.

20 Claims, 9 Drawing Sheets

(56) References Cited

U.S. PATENT DOCUMENTS

| | | | |
|---|---|---|---|
| 8,243,547 B2 * | 8/2012 | Stewart | G01V 1/364 367/24 |
| 8,451,682 B2 | 5/2013 | Soubaras | |
| 8,456,695 B2 | 6/2013 | Miyamura | |
| 2007/0203673 A1 | 8/2007 | Sherrill et al. | |
| 2012/0092956 A1 | 4/2012 | Soubaras | |
| 2012/0213033 A1 | 8/2012 | Soubaras | |
| 2012/0218859 A1 | 8/2012 | Soubaras | |
| 2012/0241166 A1 | 9/2012 | Sun | |
| 2013/0279290 A1 * | 10/2013 | Poole | G01V 1/38 367/24 |
| 2014/0362658 A1 | 12/2014 | Poole | |

OTHER PUBLICATIONS

R. Soubaras et al., "Deghosting by Joint Deconvolution of a Migration and a Mirror Migration," SEG Denver 2010 Annual Meeting, Oct. 16-21, 2010, pp. 3406-3410, SEG.

R. Soubaras et al., "Variable-Depth Streamer Acquisition: Broadband Data for Imaging and Inversion," SEG San Antonio Annual Meeting, Sep. 18-23, 2011, pp. 2364-2368, SEG.

R. Soubaras et al., "Variable-Depth Streamer Acquisition: Broadband Data for Imaging and Inversion," Geophysics, Mar. 21, 2013, pp. WA27-WS39, vol. 78, Geophysics.

R. Soubaras et al., "Pre-Stack Deghosting for Variable-Depth Streamer Data," SEG Las Vegas 2012 Annual Meeting, Nov. 4-9, 2012, pp. 1-5, SEG.

British Search Report mailed Oct. 22, 2013, in related British Application No. GB 1307120.4.

International Search Report mailed Oct. 22, 2014, in related International Application No. PCT/EP2014/054065.

Written Opinion mailed Oct. 22, 2014, in related International Application No. PCT/EP2014/054065.

F. Gamar-Sadat et al., "Velocity Model Building for Variable-Depth Streamer Data: Brunei Case Study," SEG Technical Program Expanded Abstracts, Aug. 19, 2013, pp. 4842-4846, XP055144734.

R. Soubaras, "Pre-Stack Deghosting for Variable-Depth Streamer Data," SEG Technical Program Expanded Abstracts, Sep. 1, 2012, pp. 1-5, XP055145406.

R. Soubaras et al., "Velocity Model Building by Semblance Maximization of Modulated-Shot Gathers," Geophysics, Sep.-Oct. 2007, pp. U67-U73, vol. 72, No. 5, XP001506284.

Office Action in related U.S. Appl. No. 13/859,105 dated Nov. 19, 2015.

* cited by examiner

DEVICE AND METHOD FOR DEGHOSTING VARIABLE DEPTH STREAMER DATA INCLUDING PARTICLE MOTION DATA

CROSS-REFERENCE TO RELATED APPLICATIONS

The present application claims the benefit of priority to U.S. Provisional Application No. 61/832,452, entitled "PRE-STACK POST-MIG RECEIVER DEGHOST USING MC STREAMER DATA," and filed on Jun. 7, 2013. The entire content of the above document is hereby incorporated by reference into the present application.

BACKGROUND

1. Technical Field

Embodiments of the subject matter disclosed herein generally relate to methods and systems and, more particularly, to mechanisms and techniques for de-ghosting seismic data collected with one or more streamers having variable depths.

2. Discussion of the Background

Recently, interest in developing new oil and gas production fields has dramatically increased. However, the availability of land based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where or where not to drill (to avoid a dry well).

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, improving the resolution of images of the structures under the seafloor is an ongoing process.

During a seismic gathering process, as shown in FIG. 1, a vessel 10 tows plural detectors 12. The plural detectors 12 are disposed along a cable 14. Cable 14 together with its corresponding detectors 12 are sometimes referred to, by those skilled in the art, as a streamer 16. The vessel 10 may tow plural streamers 16 at the same time. The streamers may be disposed horizontally, i.e., lying at a constant depth $z_1$ relative to the surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are distributed along a slanted straight line 14 that makes a constant angle α with a reference horizontal line 30.

With reference to FIG. 1, the vessel 10 may tow a sound source 20 configured to generate an acoustic wave 22a. The acoustic wave 22a propagates downward and penetrates the seafloor 24, eventually being reflected by a subsurface 26. The reflected acoustic wave 22b propagates upward and is detected by detector 12. For simplicity, FIG. 1 shows only two paths 22a corresponding to the acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water surface 18. Since the interface between the water and air is well approximated as a quasi-perfect reflector (i.e., the water surface acts as a mirror for the acoustic waves), the reflected wave 22c is reflected back toward the detector 12 as shown by wave 22d in FIG. 1. Wave 22d is normally referred to as a ghost wave because this wave is due to a spurious reflection. The ghosts are also recorded by the detector 12, but with a reverse polarity and a time lag relative to the primary wave 22b. The degenerative effect that the ghost arrival has on seismic bandwidth and resolution is known. In essence, interference between primary and ghost arrivals causes notches, or gaps, in the frequency content recorded by the detectors.

The traces may be used to determine the subsurface 26 (i.e., earth structure below surface 24). However, the ghosts disturb the accuracy of the final image of the subsurface and, for at least this reason, various methods exist for removing the ghosts, i.e., de-ghosting, from the results of a seismic analysis.

U.S. Pat. Nos. 4,353,121 and 4,992,992, the entire contents of which are incorporated herein by reference, describe processing procedures that allow ghosts to be removed from recorded seismic data by using an acquisition device that includes a seismic streamer slanted at an angle (on the order of 2 degrees) to the surface of the water (slanted streamer).

The methods described in U.S. Pat. Nos. 4,353,121 and 4,992,992 are seismic processing procedures in one dimension and in two dimensions. Such procedures, however, cannot be generalized to three dimensions. This is so because a sampling interval of the sensors in the third dimension is given by the separation between the streamers, on the order of 100 m, which is much larger than the sampling interval of the sensors along the streamers, which is on the order of 12.5 m.

Thus, the above-discussed methods are not appropriate for seismic data collected with streamers having a curved profile as illustrated in FIG. 3. Such configuration has a streamer 52 with a curved profile defined by three parametric quantities, $z_0$, $s_0$ and $h_c$. It is noted that not the entire streamer has to have the curved profile. The first parameter $z_0$ indicates the depth of the first detector 54a relative to the surface 58 of the water. The second parameter $s_0$ is related to the slope of the initial part of the streamer 52 relative to a horizontal line 64. The example shown in FIG. 3 has the initial slope $s_0$ equal to substantially 3 percent. It is noted that the profile of the streamer 52 in FIG. 3 is not drawn to scale because a slope of 3 percent is a relatively small quantity. The third parameter $h_c$ indicates a horizontal length (distance along the X axis in FIG. 3 measured from the first detector 54a) of the curved portion of the streamer. This parameter may be in the range of hundreds to thousands of meters.

For such streamers, a de-ghosting process has been disclosed in U.S. patent application Ser. No. 13/272,428 (herein '428) authored by R Soubaras, the entire content of which is incorporated herein. According to '428, a method for de-ghosting uses joint deconvolution for migration and mirror migration images for generating a final image of a subsurface. The de-ghosting is performed at the end of the processing (during an imaging phase) and not at the beginning as with traditional methods. Further, '428 discloses that no datuming step is performed on the data.

Despite the utility of the foregoing methods, a need exists for generating improved images of underwater geological structures.

SUMMARY

As detailed herein, a method for de-ghosting seismic data related to a subsurface may include receiving input seismic data corresponding to seismic receivers that are located at different depths ($z_r$), generating migration data (du) and mirror migration data (dd) from the seismic data, deriving a ghost-free model (m) based on simultaneously using the migration data (du) and mirror migration data (dd), using the ghost-free model to generate a de-ghosted dataset, and generating a final image (f) of the subsurface using the de-ghosted dataset. In certain embodiments, the input seismic data may include particle velocity data. The particle velocity data may have been acquired directly or may be derived from other particle motion data. The migration data may be in the time or depth domain, with pre-stack dimension offset or angle, or the like.

Deriving the ghost free model may include solving an equation d=Lm for m, where L is a linear operator that incorporates a first ghost lag model ($\tau_{gu}$) corresponding to the migration data (du) and a second ghost lag model ($\tau_{gd}$) corresponding to the mirror migration data (dd); m is a ghost-free model of the seismic data, and d contains data from the migration data (du) and the mirror migration data (dd). The model (m) may be in the parabolic Radon domain, the linear Radon domain, the FK domain, the hyperbolic Radon domain or the like.

A computing device that incorporates the method for de-ghosting seismic data is also described herein.

In addition to the foregoing, a method for processing seismic data related to a subsurface includes receiving migration data (du) and mirror migration data (dd) generated from time-domain seismic data recorded by seismic receivers, deriving a first ghost lag model ($\tau_{gu}$) corresponding to the migration data (du) that estimates a first ghost lag to a seismic source as a function of an offset h of each seismic receiver, deriving a second ghost lag model ($\tau_{gd}$) corresponding to the mirrored migration data (dd) that estimates a second ghost lag to the seismic source as a function of an offset h of each seismic receiver and processing the migration data (du) using the first and second ghost lag models to provide a final image (f) of the subsurface.

As described herein, the above apparatus and methods may be used to generate improved images of underwater geological structures.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
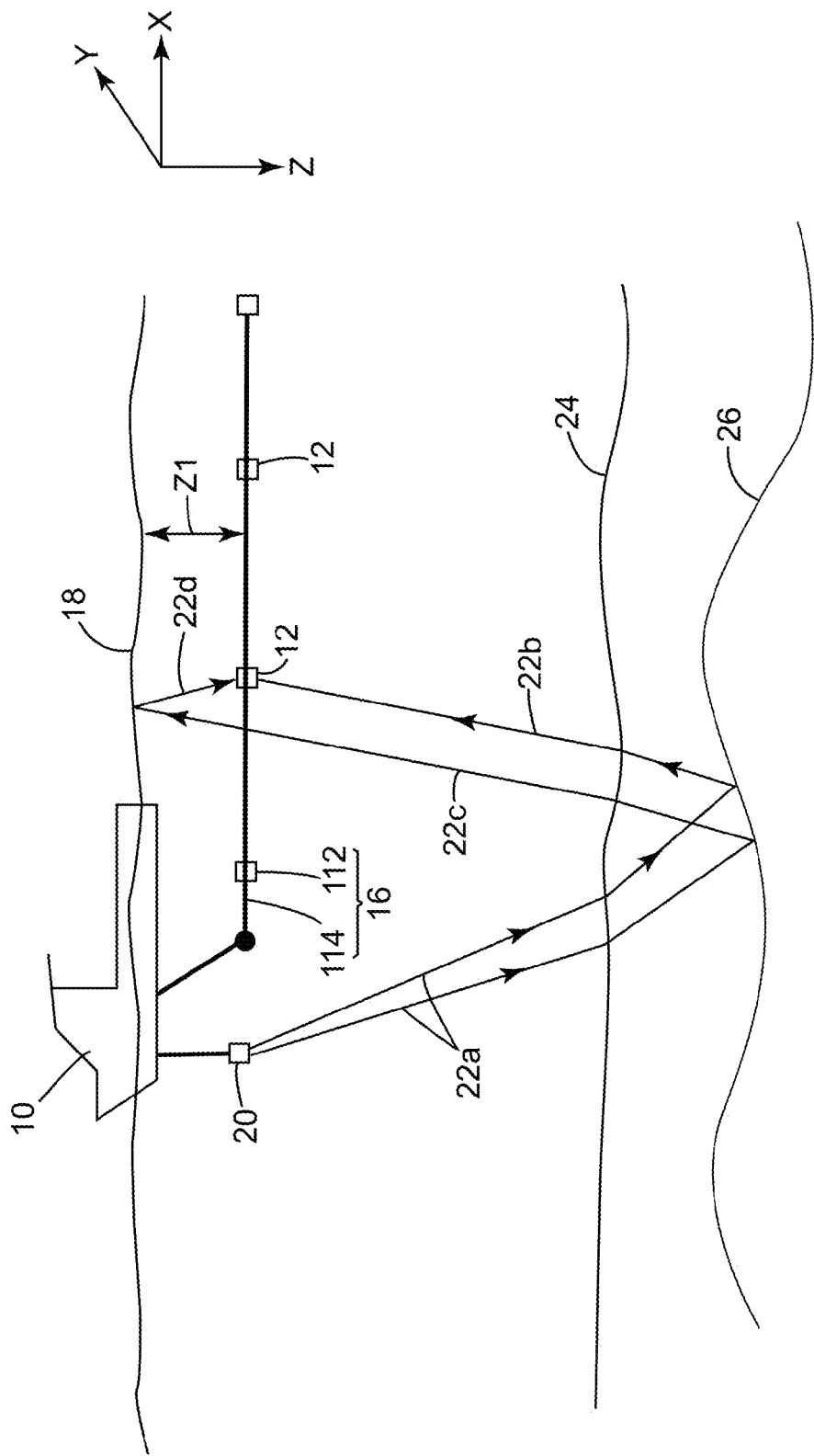
FIG. 1 is a schematic diagram of a conventional seismic data acquisition system having a horizontal streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a two-dimensional (2D) wave-field propagation. However, the embodiments to be discussed next are not limited to 2D wave-fields, but may be also applied to 3D wave-fields.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

According to an embodiment, a novel method performs receiver de-ghosting by use of migrated common image gathers (migration and mirror migration). This is achieved by deriving a ghost free model of the data, which, when reverse transformed and re-ghosted simultaneously, matches gathers from the migration and mirror migration. In certain embodiments, the data may include particle velocity data. The particle velocity data may have been acquired directly, or may be derived from other particle motion data. For example, particle velocity data may be computed by integrating accelerometer data or differentiating particle position data. The use of particle velocity data may complement the use of conventional hydrophone (i.e., pressure) data in that the ghost trough for hydrophone data may correspond to a ghost peak for the vertical component of the particle velocity data Once the ghost-free model has been derived, it is used to generate a primary and ghost data estimate, which are simultaneously adaptively subtracted from the input data. The output data is the adapted primary, plus any residual. The residual can be scaled to achieve de-noising if necessary. The method works in temporal windows. The ghost estimate may be generated with reference to the migration and/or mirror migration dataset. In the case that two ghost datasets are made, an adaptive subtraction may be applied to the migration using primary and migration ghost datasets, and independently to the mirror migration using primary and mirror migration ghost datasets. In this case, two primary datasets have been found which may be combined by averaging.

The method is now discussed in more detail. An operator L links data d to a model m of de-ghosted data as noted in the equation d=Lm (1). More specifically, considering that d is a concatenation of migration data du and mirror migration data dd for a common image gather of nmax traces for one frequency slice, and that in some embodiments du and dd may include terms corresponding to both hydrophone data and particle motion data, and m is the model domain containing kmax parabolic traces, equation (1) can be rewritten in matrix form as:

$$\begin{pmatrix} du_1 \\ du_2 \\ \vdots \\ du_{nmax} \\ - \\ dd_1 \\ dd_2 \\ \vdots \\ dd_{nmax} \end{pmatrix} = \begin{pmatrix} e^{2\pi i f \tau_{pr}[n,k]} \mp e^{2\pi i f (\tau_{pr}[n,k]+\tau_{gu}[n])} & - & - \\ & - & - & - \\ & & - & - \\ e^{2\pi i f \tau_{pr}[n,k]} \mp e^{2\pi i f (\tau_{pr}[n,k]+\tau_{gd}[n])} & - & - \\ & - & - & - \\ & & - & - \end{pmatrix} \begin{pmatrix} m_1 \\ m_2 \\ \vdots \\ m_{kmax} \end{pmatrix} \quad (2)$$

The time-shift $\tau_{pr}[n, k]$ represents the lag associated with the primary events of the $n^{th}$ common image gather trace and $k^{th}$ model parameter, while the time shift $(\tau_{pr}[n, k]+\tau_{gu}[n])$ or $(\tau_{pr}[n, k]+\tau_{gd}[n])$ represents the total lag associated with ghost reflections in the $n^{th}$ detector and $k^{th}$ model parameter in the migration data du and mirror migration dd, respectively. Therefore, d and L simultaneously provide a solution for the migration data (via the upper half of d and L) and mirror migration data (via the lower half of d and L). In certain embodiments, the input seismic data d includes particle velocity data. The particle velocity data may have been acquired directly or may be derived from other particle motion data. It should be noted that the polarity of the second exponential terms (e.g., $e^{2\pi i f(\tau_{pr}[n,k]+\tau_{gu}[n])}$) in the matrix L may vary depending on if the row of the matrix relates to hydrophone data or particle velocity data. The negative polarity shown in equation (2) (and similar equations disclosed herein) relates to hydrophone data. For vertical particle velocity data the second exponential terms will be positive.

The time shifts $\tau_{gu}[n]$ and $\tau_{gd}[n]$ may be defined by a first and a second ghost lag model that are derived from the migration data and mirror migration data, respectively. The first ghost lag model ($\tau_{gu}$) and the second ghost lag model ($\tau_{gd}$) may estimate a ghost lag to the seismic source as a function of an offset h of each seismic receiver n. For example, in certain embodiments, the ghost lag models are defined by a second order polynomial equation such as $\tau[n]=\tau_0+p\cdot h[n]+q\cdot h[n]^2$ (3) where h[n] is the horizontal offset between the source and the nth common image gather trace (corresponding to the nth column of data) and where $\tau_0$, p and q are the zeroth, first (linear) and second (parabolic) order lag coefficients, respectively.

According to an embodiment, the above equations are used to achieve a ghost-free model (m) at sea surface datum based on the parabolic wave propagation properties of the primary and ghost components. Deriving ghost lag models for both the migration data and mirror migration data and generating a ghost-free model (m) may improve the de-ghosting process and provide a better final image (f) of the subsurface.

Assuming 3D migration algorithms have been used to generate the migration and mirror migration datasets, the algorithm is capable of correctly de-ghosting according to 3D ghost propagation. For 2D datasets where only 2D migration is possible, the algorithm is still effective but 3D ghost propagation will not be optimally handled.

One or more of the embodiments discussed above may be implemented in a method for de-ghosting seismic data. According to one embodiment illustrated in FIG. 4, a method 400 for de-ghosting seismic data related to a subsurface includes receiving (410) input seismic data, generating (420, i.e., 420a and 420b) migration data (du) and mirror migration data (dd), deriving (430) a ghost lag model for the migration and mirror migration data, deriving (440) a ghost-free model (m) of the migration data, generating (450) primary (p), migration ghost ($g_m$), and mirror migration ghost ($g_{mm}$) dataset portions of the migration data, adaptively subtracting (460a) the primary (p) and migration ghost ($g_m$) datasets from the migration data (du) to obtain a first adapted primary ($p^{t1}$) dataset and a first adapted residual ($r^{t1}$) dataset, adaptively subtracting (460b) the primary (p) and mirror migration ghost ($g_{mm}$) datasets from the mirror migration data (dd) to obtain a second adapted primary dataset ($p^{t2}$) and a second adapted residual dataset ($r^{t2}$) and generating (470) a final image of the subsurface based on the adapted primary datasets ($p^{t1}$ and $p^{t2}$) and the adapted residual datasets ($r^{t1}$ and $r^{t2}$). The method 400 may be applied to a variety of streamer configurations such as those shown in FIGS. 1-3.

Figure 2:
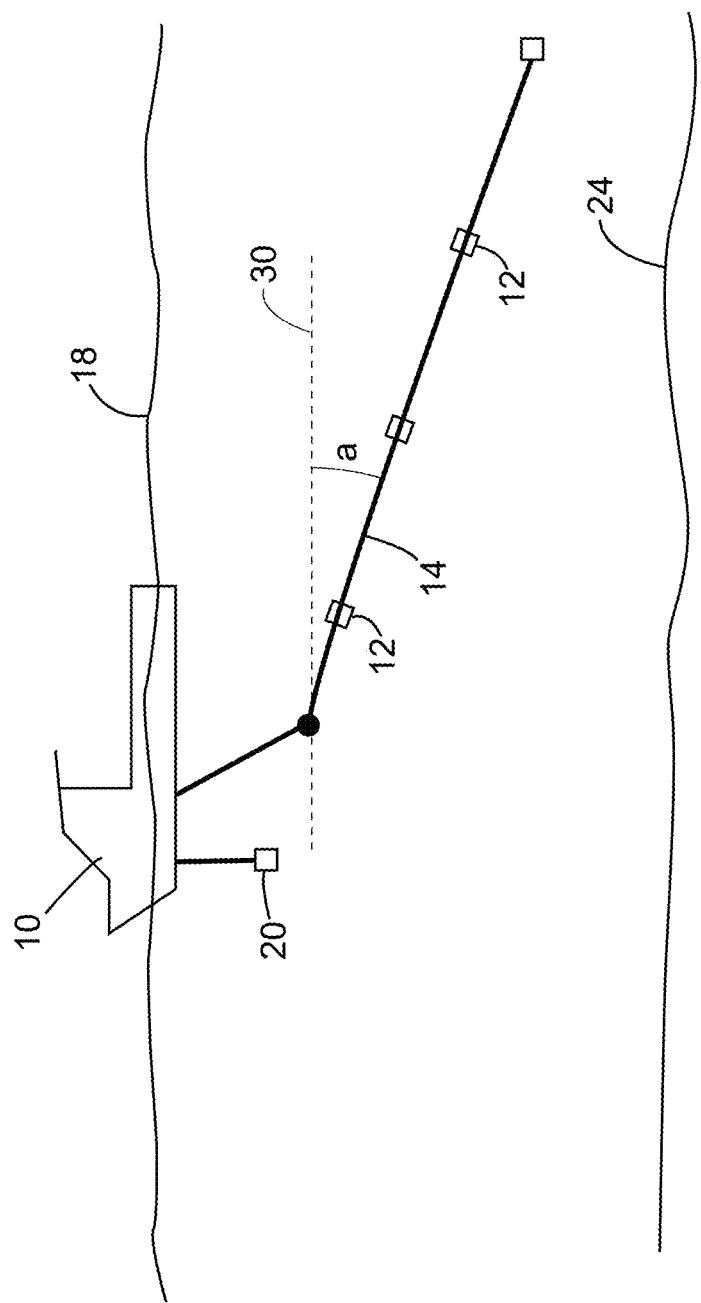
FIG. 2 is a schematic diagram of a seismic data acquisition system having a slanted streamer.
Figure 3:
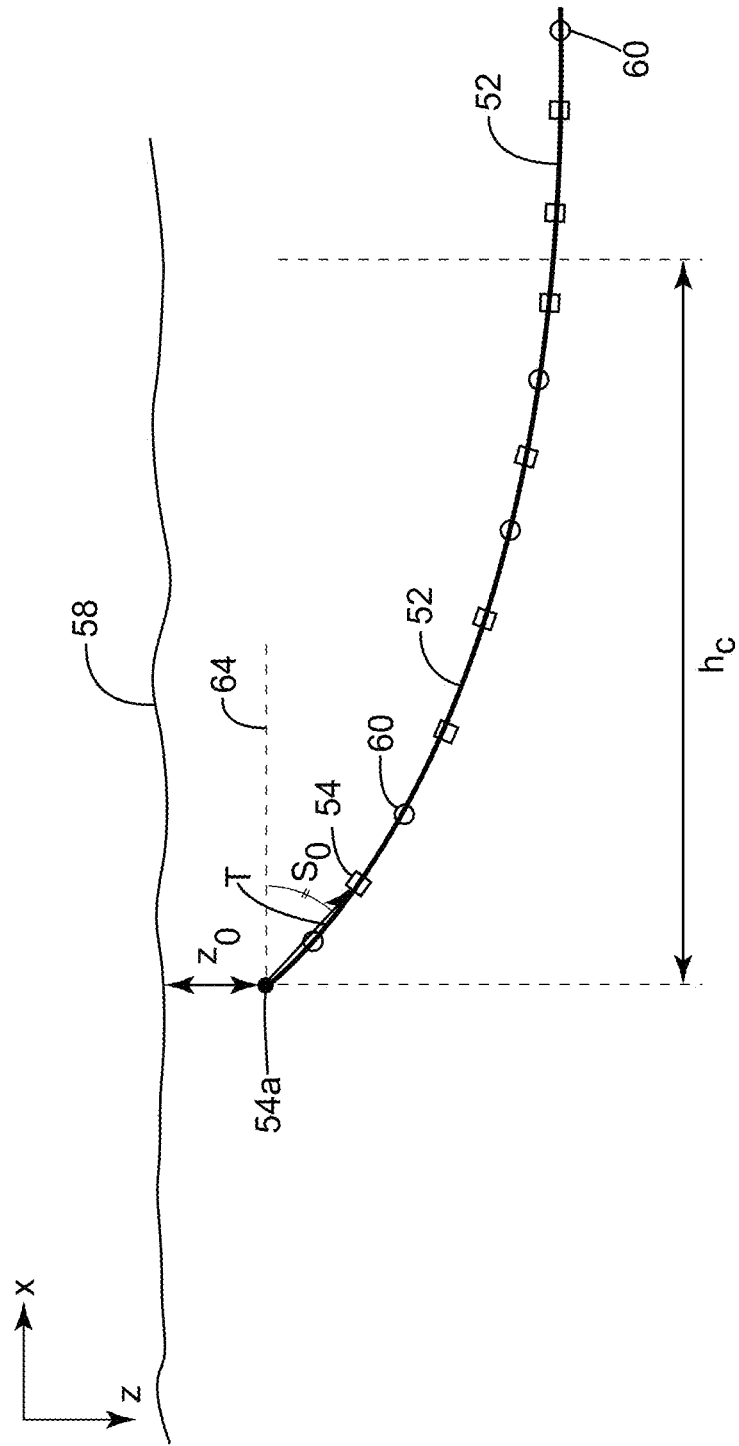
FIG. 3 is a schematic diagram of a seismic data acquisition system having a curved profile streamer.

Receiving (410) seismic data may include receiving input seismic data recorded by a set of seismic receivers that are towed by a vessel. The input seismic data may be recorded in a time-space domain and the seismic receivers may be located at different depths ($z_r$). For example, the seismic receivers may be arranged in a sloped formation as shown in FIG. 2 or a curved formation as shown in FIG. 3. The seismic receivers may provide hydrophone (i.e., pressure) data, particle motion data or a combination thereof. The particle motion sensors may utilize accelerometers, differential pressure sensors, direct particle motion sensors, or other sensors designed to detect signals relating to particle motion.

Generating (420) migration data (du) and mirror migration data (dd) from the input seismic data may include executing a variety of migration algorithms. These may include, but are not limited to, Kirchhoff migration, Gaussian beam migration, or reverse time migration. Migrations that provide output in the depth or time domain may be used. The migrated data may be in offset, angle, or other pre-stack domain. The migration data (du) may correspond to an upward traveling wave reflected from the subsurface while the mirror migration data (dd) may correspond to a downward traveling wave reflected from the surface (i.e. the water/air interface).

Figure 6:
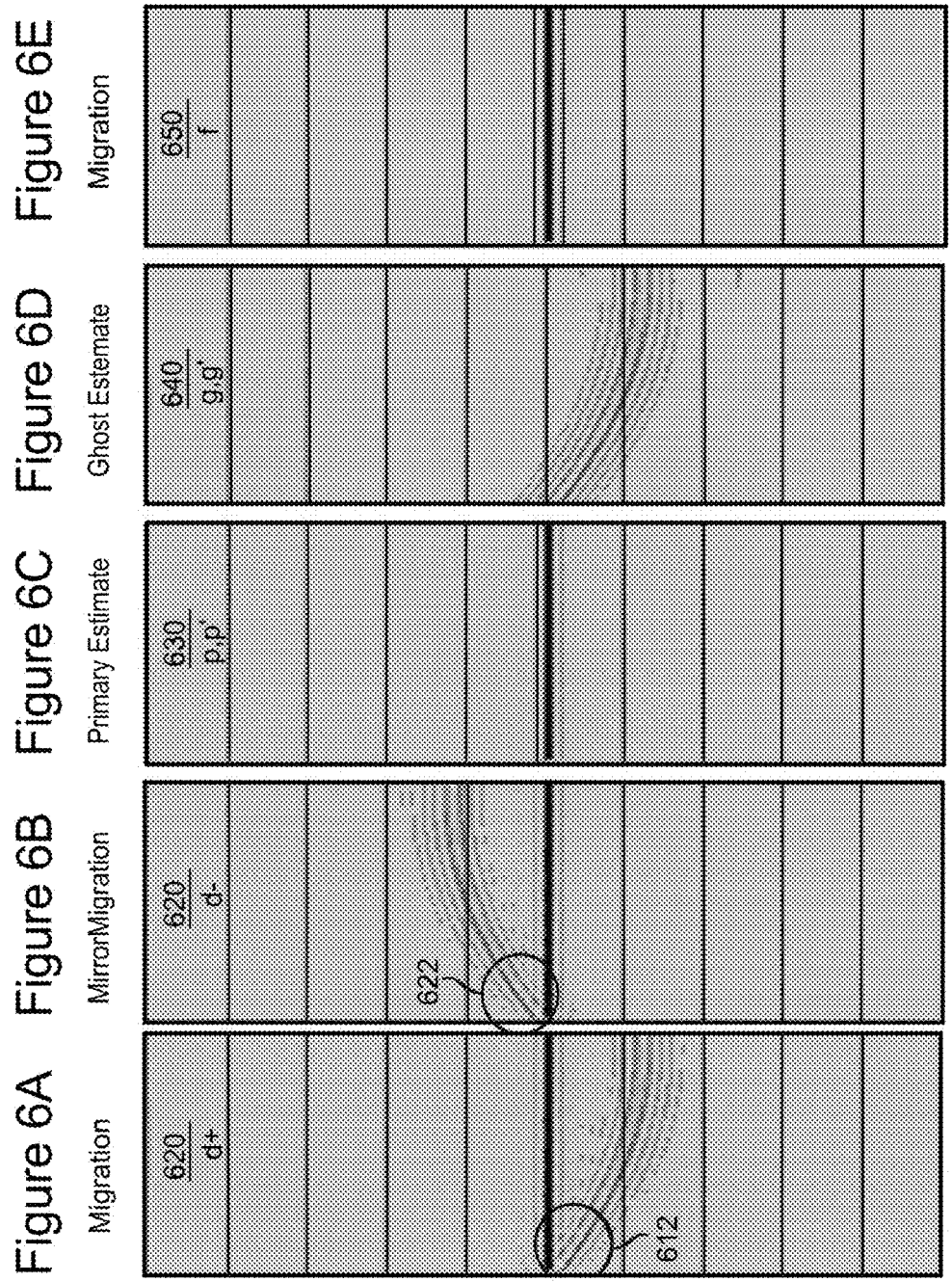
FIGS. 6A to 6E are graphs illustrating synthetic migration and mirror migration data processed according to the methods of FIGS. 4 and 5.

In certain embodiments, generating (420a) migration data (du) and generating (420b) mirror migration data (dd) includes executing a conventional migration operation on the input data from two (datum) perspectives. Firstly, the data is migrated using the actual cable datum, thus generating the migration dataset. Secondly, the data is migrated using a ghost cable position (i.e. using hypothetical receiver depths where the cable is assumed to be above the water surface) to generate the mirror migration dataset. For the migration data, the primary event (induced by the source) of the upward waves are aligned and the ghost reflections are consequently misaligned. For mirror migration data, the ghost reflections present in the downward traveling wave are aligned and the primary events are consequently misaligned. The polarity of the mirror migration data may be reversed to undo the polarity reversal that occurs at the water/air interface. See FIGS. 6A and 6B for a synthesized example of migration data and mirror migration data.

Additional details and embodiments regarding the operation of generating (420) migration data (du) and mirror migration data (dd) may be found in commonly assigned U.S. patent application Ser. No. 13/464,109 (Pat. Pub. US 2012/0218859) and commonly assigned U.S. patent application Ser. No. 13/464,126 (Pat. Pub. US 2012/0213033), each of which is incorporated herein by reference.

Deriving (430) a ghost lag model for the migration and mirror migration data may include computing a slant stacked cross-correlation between the migration data (du) and the mirror migration data (dd) for a variety of slants and selecting the slant (i.e., first order ghost lag term) with the highest cross-correlation coefficient. Slant stacking may align the primary events in the mirror migration data with the primary events in the migration data for the traces that have an essentially linear lag (as a function of receiver distance) between the primary event and the ghost reflections. See linear regions 612 and 622 in FIGS. 6A and 6B for an example of regions of essentially linear lag.

Returning to FIG. 4, deriving (430a and 430b) may also include computing a curved stacked autocorrelation for the migration data (du) and the mirror migration data (dd) for a variety of curve shapes and selecting the curve shape (and the corresponding higher order ghost lag terms) with the highest auto-correlation coefficient. Curve stacking may help align the primary events with the ghost reflections (within either the migration data or the mirror migration data) particularly for traces that are not in the linear region of the migration and mirror migration data. See FIG. 5 and the associated description for additional details on deriving (430) the ghost lag models for the migration and mirror migration data. Higher order terms may be added as necessary to fully define the ghost lags. The migration and mirror migration ghost lags are non-stationary, and thus must be evaluated in different time windows.

Returning again to FIG. 4, deriving (440) a ghost-free model (m) of the migration data may include converting the migration and mirror migration data to the frequency domain and solving for the ghost free model (m) that generates the migration and mirror migration frequency domain data (d) when multiplied by a linear operator L that incorporates a first ghost lag model ($\tau_{gu}$) corresponding to the migration data (du) and a second ghost lag model ($\tau_{gd}$) corresponding to the mirror migration data (dd).

The first and second ghost lag models ($\tau_{gu}$ and $\tau_{gd}$) may be incorporated into the linear operator L via a ghost reflection term $e^{2\pi i f(\tau_{pr}+\tau_g)}$ where or $\tau_g=\tau_{gu}$ or $\tau_{gd}$ according the form:

$$L = \begin{pmatrix} e^{2\pi i f \tau_{pr}[n,k]} \mp e^{2\pi i f(\tau_{pr}[n,k]+\tau_{gu}[n])} & - & - \\ & - & - & - \\ & - & & \\ e^{2\pi i f \tau_{pr}[n,k]} \mp e^{2\pi i f(\tau_{pr}[n,k]+\tau_{gd}[n])} & - & - \\ & - & & \end{pmatrix} \quad (3)$$

which is also shown in equation (2) introduced above.

In one embodiment, the primary lag term is defined by the equation $\tau_{pr}[n,k]=k \cdot h[n]^2$ (4) where h[n]=the offset relating to the common image trace being constructed k is a second order lag coefficient that corresponds to $m_k$. In one embodiment the ghost lag terms $\tau_{gu}[n]$ and $\tau_{gd}[n]$ are defined by the equation $\tau_g[n]=\tau_0+p^*h[n]+q^*h[n]^2$ (5) where $\tau_0$, is the zero offset lag and p and q are the first and second order lag coefficients as defined by the ghost lag model. $\tau_{pr}[n, k]$ defines the reverse parabolic Radon travel times to transform the primary data reflectivity from model to data space. The ghost models are a copy of this primary reflectivity with a time shift and a reverse in polarity. The time shift to make the migration ghost model is given by $\tau_{gu}$, and the time shift to make the mirror migration ghost model is given by $\tau_{gd}$. The time shifts $\tau_{gu}$ and $\tau_{gd}$ are defined by a parametric model derived in the initial scanning phase of the algorithm in the form of a zero offset shift ($\tau_0$), linear term (p) and parabolic term (q). Although the above ghost lag terms (i.e., models) are defined by a second order polynomial equation, a second order polynomial equation is not required by the method 400 and any appropriate lag model may be used. For example, a third or fourth order ghost lag model may be fit to the migration and mirror migration data.

Image resolution may be improved by varying the ghost lag models with time (or depth in the case that depth migration has been used). This may be implemented with a time domain version algorithm which has ghost lags that vary as a function of time, or by processing the data in overlapping temporal windows. Each temporal window will have its own ghost lag functions relating to the migration and mirror migration and will be modeled independently after a Fourier transform operation to the frequency domain.

One of skill in the art will appreciate that multiplying by the primary event and ghost reflection terms $e^{2\pi i f \tau_{pr}}$ and $e^{2\pi i f(\tau_{pr}+\tau_g)}$ within the matrix L effectively performs a series of phase shift operations on the frequency domain model m and that phase shifting in the frequency domain is equivalent to time shifting (i.e. applying a time lag) in the time domain. One of skill in the art will also appreciate that phase shifting in the frequency domain, which uses complex numbers, is not restricted to discrete phase shift values, while time shifting in the time domain, which uses real numbers, is typically restricted to discrete time shift values. Thus solving for the model m in the frequency domain, may result in a better model m and a better final image of a subsurface.

It should also be noted that any appropriate model domain such as a parabolic radon domain, a linear radon domain, a hyperbolic radon domain, and an f-k (frequency-wavenumber) domain may be used.

Having a ghost-free model (m) that is derived using ghost lag models for both the migration data and the mirror migration data facilitates processing both the migration data and the mirror migration data. For example, subsequent to deriving 440 a ghost free model (m), the method 400 may continue by generating (450) primary (p) and ghost (g) dataset portions of the migration data. In one embodiment, the primary (p) and ghost (g) dataset portions (see FIGS. 6C and 6D for a synthesized example) are generated according to the matrix equations:

$$\begin{pmatrix} p_1 \\ p_2 \\ \vdots \\ p_{nmax} \end{pmatrix} = \begin{pmatrix} \mp e^{2\pi i f \tau_{pr}[n,k]} & - & - \\ & - & - & - \\ & - & & \end{pmatrix} \begin{pmatrix} m_1 \\ m_2 \\ \vdots \\ m_{kmax} \end{pmatrix} \quad (6)$$

$$\begin{pmatrix} gu_1 \\ gu_2 \\ \vdots \\ gu_{nmax} \end{pmatrix} = \begin{pmatrix} \mp e^{2\pi i f(\tau_{pr}[n,k]+\tau_{gu}[n])} & - & - \\ & - & - & - \\ & - & & \end{pmatrix} \begin{pmatrix} m_1 \\ m_2 \\ \vdots \\ m_{kmax} \end{pmatrix} \quad (7)$$

Similarly, the ghost dataset portion of the mirror migration data may be generated using the matrix equation:

$$\begin{pmatrix} gd_1 \\ gd_2 \\ \vdots \\ gd_{nmax} \end{pmatrix} = \begin{pmatrix} \mp e^{2\pi i f(\tau_{pr}[n,k]+\tau_{gd}[n])} & - & - & - \\ & - & & - & - \\ & - & & - & - \end{pmatrix} \begin{pmatrix} m_1 \\ m_2 \\ \vdots \\ m_{kmax} \end{pmatrix} \quad (8)$$

Subsequent to generating primary (p) (via 450a) and ghost (g) (via 450b) dataset portions of the migration data, the method 400 may proceed by adaptively subtracting (460) the primary (p) and ghost (g) datasets from the migration data (du) to provide adapted primary (p') and adapted residual (r') datasets. The mirror migration data may be similarly processed. Adaptively subtracting (460) the primary (p) and ghost (g) datasets from the migration data (du) and generating (470) a final image (f) of the subsurface based on the adapted primary (p') and the adapted residual (r') datasets may improve the quality of the final image (f). Adaptive subtraction is a routine algorithm used in demultiple, for example, surface related multiple attenuation. For more information on adaptive subtraction see, for example, "Seismic multiple removal techniques past, present and future," D. J. Verschuur, page 45, which is incorporated herein by reference.

Figure 5:
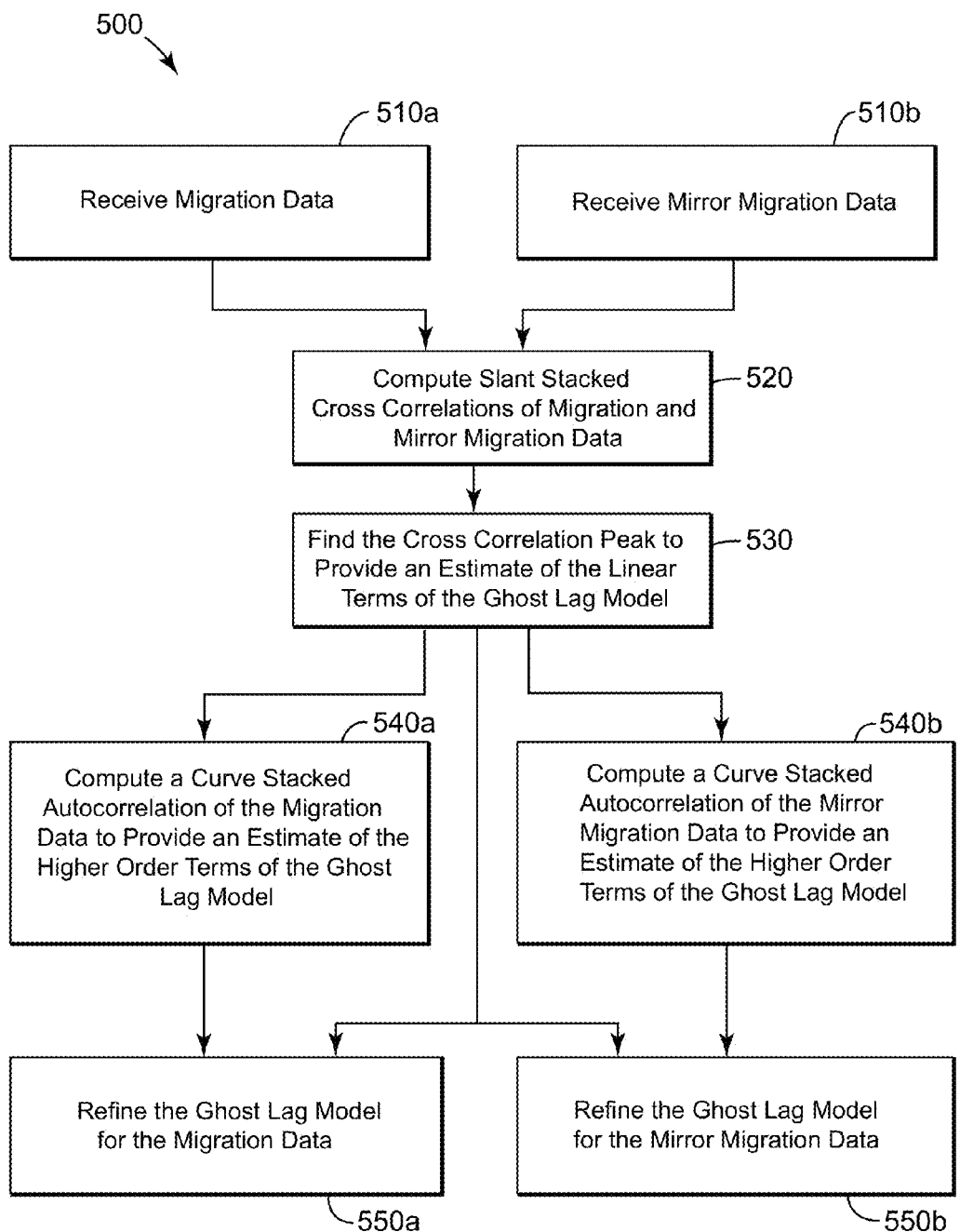
FIG. 5 is a flowchart of a method for ghost lag modeling of migration data and mirror migration data according to one embodiment.

FIG. 5 is a flowchart of a method 500 for generating a ghost lag model for migration data and mirror migration data. As depicted, the method 500 includes receiving (510, i.e. 510a and 510b) migration and mirror migration data, computing (520) slant stacked correlations of migration and mirror migration data, finding (530) a cross correlation peak, computing (540) a curved stacked autocorrelation of the migration and mirror migration data, and refining (550) the ghost lag model for the migration and mirror migration data. The ghost lag models for the migration data and the mirror migration data may be concurrently (or sequentially) generated by the method 500 and used in executing the method 400.

Receiving (510) may include receiving (510a) migration data (du) and receiving (510b) mirror migration data (dd) generated (420) from input seismic data recorded by a set of seismic receivers that are towed by a vessel. The input seismic data may be recorded in a time-space domain and the seismic receivers may be located at different depths ($z_r$).

Computing (520) slant stacked correlations of migration and mirror migration data may include correlating the migration data and the mirror migration data with various linear time shifts between the migration data and the mirror migration data. For example, in one embodiment the time shift between columns of the migration data and the mirror migration data conforms to a linear time shift equation such as $\tau[n]=\tau_0+p*h[n]$ (9) where h[n] is the horizontal offset between the source and the nth receiver (or nth column of data) and where $\tau_0$ and p are the zeroth and first order lag (or slowness) coefficients. The linear time shift equation may be restricted to columns of data corresponding to receivers that are close to the source. See the linear regions 612 and 622 in FIGS. 6A and 6B for an example of such columns of data.

Finding (530) a cross correlation peak may include determining the slant stacked correlation for various values of $\tau_0$ and p to determine the $\tau_0$ and p values which result in the peak slant stacked cross correlation value. In some embodiments, interpolation is used to improve the resolution of the peak finding process. Also the times may be spatially averaged or constrained in other ways to ensure stability.

Similarly, computing (540) a curve stacked autocorrelation of the migration and mirror migration data may include auto-correlating (via 540a) the migration data and auto-correlating (via 540b) the mirror migration data with various time shift curves between columns in the original data and columns in the time-shifted copy of the original data. In certain embodiments, the time shift curves conform to a second order (i.e. curve stacked) equation such as $\tau[n]=\tau_0+p*h[n]+q*h[n]^2$ (10) where h[n] is the horizontal offset between the source and the nth receiver (or nth column of data), and where $\tau_0$, p and q are the zeroth, first (linear) and second (parabolic) order lag coefficients respectively. In one embodiment, the linear coefficients $\tau_0$ and p that are determined when finding (530) the cross correlation peak, are used as initial $\tau_0$ and p values in equation (10) to find an initial value for q.

Subsequently, the method 500 may proceed by refining (550) the ghost lag model for the migration data (via 550a) and mirror migration data (via 550b). In one embodiment, refining (550) is accomplished by optimizing the coefficients of equation (10) according to a one or more conventional methods such as Gauss-Seidal, simulated annealing, Gauss-Newton, or other optimization techniques. The initial values used in the optimization process may be provided from the results of steps 530 and 540.

In summary, the method 500 may be used to derive a first ghost lag model ($\tau_{gu}$) corresponding to the migration data (du) and a second ghost lag model ($\tau_{gd}$) corresponding to the mirrored migration data (dd). Furthermore, the method 500 may be used as the deriving operation 430 within the method 400 previous to processing (440-470) the migration data (du) (or the mirror migration data (dd)) using the first and second ghost lag models to provide an improved final image (f) of the subsurface.

Figure 4:
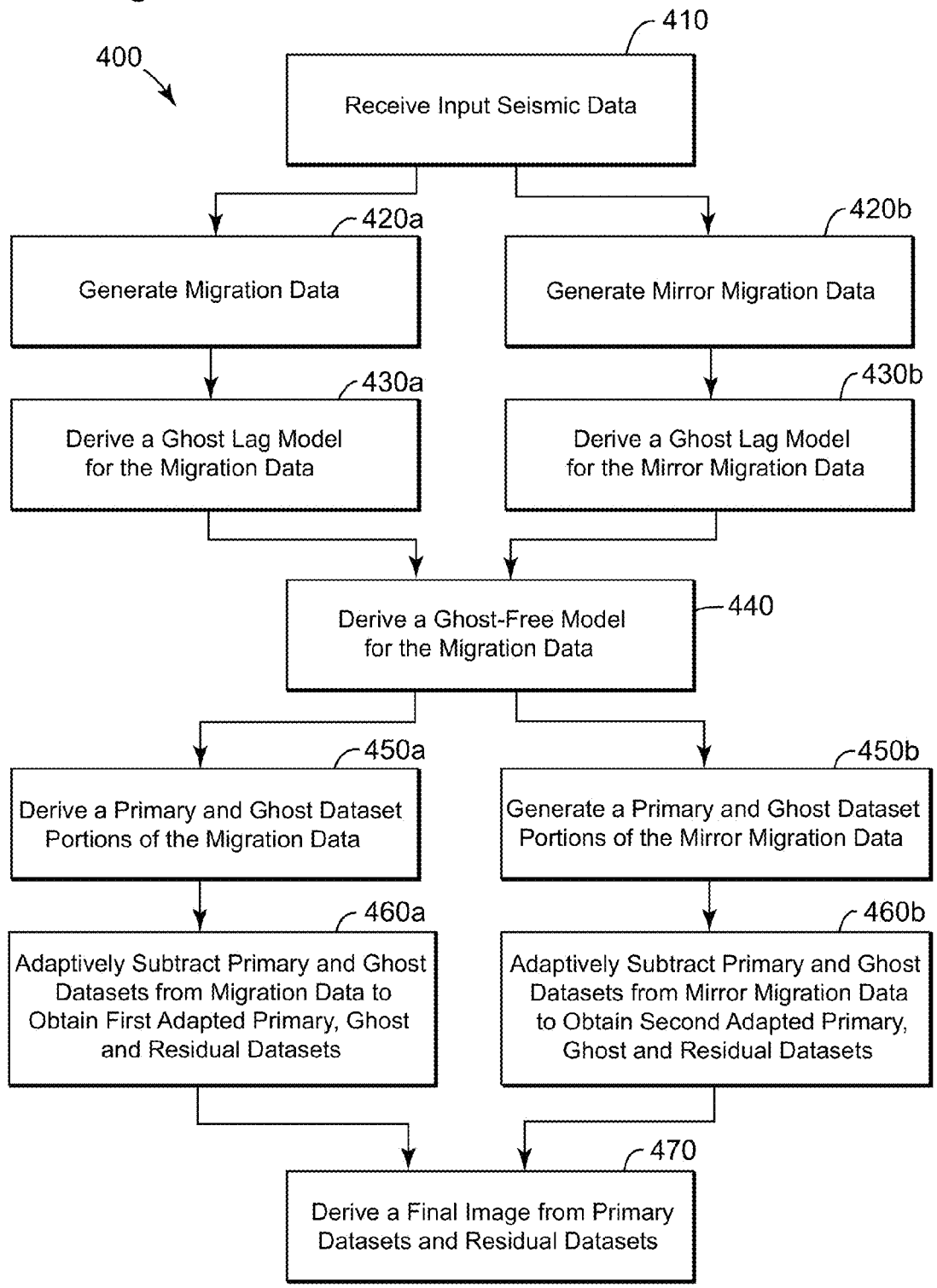
FIG. 4 is a flowchart of a method for de-ghosting seismic data according to one embodiment.

FIGS. 6A to 6E are time domain graphs illustrating synthetic migration and mirror migration data processed according to the methods of FIGS. 4 and 5. As depicted, the processed synthetic data includes migration data 610 (or du), mirror migration data 620 (or dd), primary data or adapted primary data 630 (or p,p'), ghost reflection data or adapted ghost reflection data 640 (or g, g'), and a final image 650 (or f). Although the depicted data is synthetic, the principle of ghost removal from the migration data is clearly demonstrated.

Figure 7:
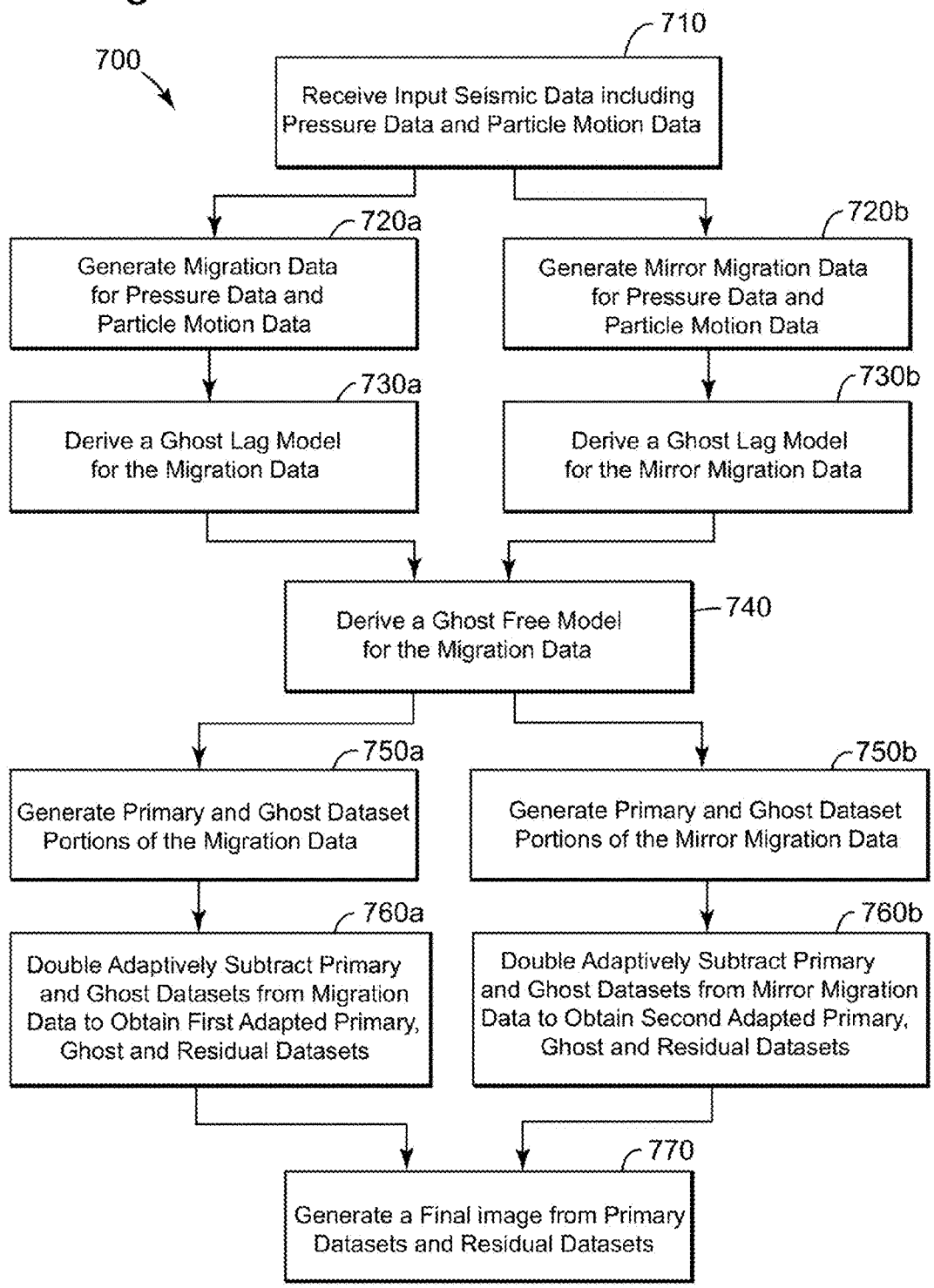
FIG. 7 is a flowchart of a method for ghost lag modeling of migration data and mirror migration data according to one embodiment that leverages hydrophone data and particle motion data.

According to one embodiment illustrated in FIG. 7, a method 700 for de-ghosting seismic data related to a subsurface includes receiving (710) input seismic data that includes both hydrophone data and particle motion data, generating (720) migration data (Hu, Vu) and mirror migration data (Hd, Vd), deriving (730) a ghost lag model for the migration and mirror migration data, deriving (740) a ghost free model (m) of the migration data, generating (750) primary (p), migration ghost ($g_m$) and mirror migration ghost ($g_{mm}$) dataset portions of the migration data, double adaptively subtracting (760a) the primary (p) and migration ghost ($g_m$) datasets from the migration data (Hu, Vu) to obtain a first adapted primary ($p'^1$) dataset and a first adapted residual ($r'^1$) dataset, double adaptively subtracting (760b) the primary (p) and mirror migration ghost ($g_{mm}$) datasets from the mirror migration data (Hd, Vd) to obtain a second adapted primary dataset ($p'^2$) and a second adapted residual dataset ($r'^2$) and generating (770) a final image of the subsurface based on the adapted primary datasets ($p'^1$ and $p'^2$) and the adapted residual datasets ($r'^1$ and $r'^2$). The method 700 may be applied to a variety of streamer configurations, such as those shown in FIGS. 1-3, that are configured to provide both hydrophone data and particle motion data.

As may be apparent to the reader, many of the steps of the method 700 are essentially the same as the steps detailed in the description of the method 400. Consequently, the description that follows hereafter will focus on aspects of the method 700 that are specific to processing input data that includes both hydrophone data and particle motion data and may not have been emphasized in the description of the method 400.

Receiving (710) seismic data may include receiving input seismic data that includes both hydrophone (i.e., pressure) data (H) and particle motion data (V). The particle motion data (V) may be used to directly or indirectly determine a vertical velocity (Vz) for particles proximate to the detectors 12 that provided the particle motion data. The additional particle velocity data may be kinematically the same as hydrophone data (i.e., arrivals at the same times for the same traces), but with a polarity reversal on the migration-ghost event and mirror migration-primary event compared to the migration-ghost event and mirror migration-primary event shown for the simulated hydrophone data in FIGS. 6A and 6B.

It should be noted that that some sensors such as particle motion sensors may be directional and contain only a component of the pressure recordings as such sensors may only be sensitive to acoustic energy travelling along the orientation of the sensor. In such cases, a procedure known as obliquity correction may be applied to the input seismic data before de-ghosting in order to achieve amplitude consistent processing. In some embodiments, obliquity correction scales directional data such as particle velocity data as a function of wave propagation angle with the goal of consistent amplitudes with the pressure data. An example is given for vertical particle velocity sensors. In 2D, the obliquity correction may be achieved through making a tau-p transform of shot gather data, and scaling the p-traces as a function of slowness (scaling factor=1/cos(theta) where cos(theta)=absolute slowness/water velocity). The same procedure may be applied in 3D having a slowness in the x and y directions. Alternatively, the obliquity correction may be applied during the migration process. For example using beam migration, a tau-px-py transform of common midpoint data may be made. Ray tracing is used to estimate the receiver side slowness of the data using ray-tracing. The receiver side slowness may be used to derive an obliquity correction which is applied before the data is migrated.

Generating (720) migration data (Hu, Vu) and mirror migration data (Hd, Vd) from the input seismic data may include generating separate migration data and mirror migration data for both the hydrophone data (H) and the vertical velocity data (Vz). Specifically, the migration data (Hu) and the mirror migration data (Hd) may be generated for the hydrophone data (H), and the migration data (Vu) and the mirror migration data (Vd) may be generated for the vertical velocity data (Vz). The migration data (Hu, Vu) may correspond to an upward traveling wave reflected from the subsurface, while the mirror migration data (Hd, Vd) may correspond to a downward traveling wave reflected from the surface (i.e. the water/air interface).

If data is not corrected, or scaled, for obliquity before the migration, the correction may be made during the generating operation 720. For example, ray-tracing may be used to estimate the incoming angle of the data. If no correction has been made, an adaptive subtraction may be made between hydrophone data (H) and the vertical motion data (V) that corrects for the incoming angle.

Subsequent to generating (720) migration data (Hu, Vu) and mirror migration data (Hd, Vd) for both the hydrophone data (H) and the particle motion data (V), the operations 730a, 730b, 740, 750a and 750b may be conducted in essentially the same manner as operations 430a, 430b, 440, 450a and 450b, respectively, which are depicted in FIG. 4 and detailed in the associated description. One of skill in the art will recognize, however, that the matrices and datasets involved in the operations of method 700 will include terms for both the hydrophone data (H) and the vertical velocity data (Vz). For example, the linear operator L used in deriving (740) a ghost-free model (m) of the migration data may replicate the primary event and ghost reflection terms $e^{2\pi i f \tau_{pr}}$ and $e^{2\pi i f(\tau_{pr}+\tau_g)}$ (where $\tau_g = \tau_{gu}$ or $\tau_{gd}$) within the matrix L according the form:

$$L = \begin{pmatrix} e^{2\pi i f \tau_{pr[n,k]}} - e^{2\pi i f(\tau_{pr[n,k]}+\tau_{gu}[n])} & - & - \\ - & - & - \\ e^{2\pi i f \tau_{pr[n,k]}} - e^{2\pi i f(\tau_{pr[n,k]}+\tau_{gd}[n])} & - & - \\ - & - & - \\ e^{2\pi i f \tau_{pr[n,k]}} + e^{2\pi i f(\tau_{pr[n,k]}+\tau_{gu}[n])} & - & - \\ - & - & - \\ e^{2\pi i f \tau_{pr[n,k]}} + e^{2\pi i f(\tau_{pr[n,k]}+\tau_{gd}[n])} & - & - \\ - & - & - \end{pmatrix} \quad (11)$$

In the above form of the matrix L, the upper and lower halves of the matrix are identical. The upper half of the matrix L corresponds to the migration data (Hu) and mirror migration data (Hd) generated from the hydrophone data (H), and the lower half corresponds to the migration data (Vu) and mirror migration data (Vd) generated from the vertical velocity data (Vz). This contrasts with the matrix L shown in equation (3) which does not explicitly show terms for hydrophone data and particle motion data (e.g., vertical velocity data). With the additional terms in the matrix L the ghost free model (m) may be derived in operation 740 by solving the equation d=Lm which in expanded form may be represented as:

$$\begin{pmatrix} Hu_1 \\ Hu_2 \\ \vdots \\ Hu_{n_{max}} \\ - \\ Hd_1 \\ Hd_2 \\ \vdots \\ Hu_{n_{max}} \\ - \\ Vu_1 \\ Vu_2 \\ \vdots \\ Vu_{n_{max}} \\ - \\ Vd_1 \\ Vd_2 \\ \vdots \\ Vd_{n_{max}} \end{pmatrix} = \begin{pmatrix} e^{2\pi i f \tau_{pr[n,k]}} - e^{2\pi i f(\tau_{pr[n,k]}+\tau_{gu}[n])} & - & - \\ - & - & - \\ e^{2\pi i f \tau_{pr[n,k]}} - e^{2\pi i f(\tau_{pr[n,k]}+\tau_{gd}[n])} & - & - \\ - & - & - \\ e^{2\pi i f \tau_{pr[n,k]}} + e^{2\pi i f(\tau_{pr[n,k]}+\tau_{gu}[n])} & - & - \\ - & - & - \\ e^{2\pi i f \tau_{pr[n,k]}} + e^{2\pi i f(\tau_{pr[n,k]}+\tau_{gd}[n])} & - & - \\ - & - & - \end{pmatrix} \begin{pmatrix} m_1 \\ m_2 \\ \vdots \\ m_{k_{max}} \end{pmatrix} \quad (12)$$

Having a ghost-free model (m) that is derived using ghost lag models for both the migration data and the mirror migration data, as well as both hydrophone data and particle motion data, facilitates improved seismic data processing.

Subsequent to operations 730 through 750, the method 700 may proceed by double adaptively subtracting (760a) the primary (p) and ghost (g) datasets from the migration data (du) to provide adapted primary (p') and adapted residual (r') datasets. The mirror migration data may be similarly processed (760b). Double adaptively subtracting (760a) the primary (p) and ghost (g) datasets from the migration data (du) and generating (770) a final image (f) of the subsurface based on the adapted primary (p') and the adapted residual (r') datasets may improve the quality of the final image (f).

One of skill in the art will appreciate that double adaption subtraction is a specific form of least squares subtraction. For more information on least squares subtraction in general, see "Seismic multiple removal techniques, past, present, and future", pages 116 to 130, Verschuur, 2006. For more information on double adaptive subtraction specifically, see, for example, "A weighted adaptive subtraction for two or more multiple models," Mei, Y., and Zou, Z., 2010 SEG conference proceedings. Each of these references is incorporated herein by reference.

The equations presented in conjunction with the method 700 may be extended or reduced depending on the number of available sensors or data components. For example, the equations could be modified to include particle motion components orientated in other directions. It should also be noted that the particle motion data may have a different number of traces than the hydrophone data. In addition the hydrophone data and the particle motion data may be at different offsets.

Figure 8:
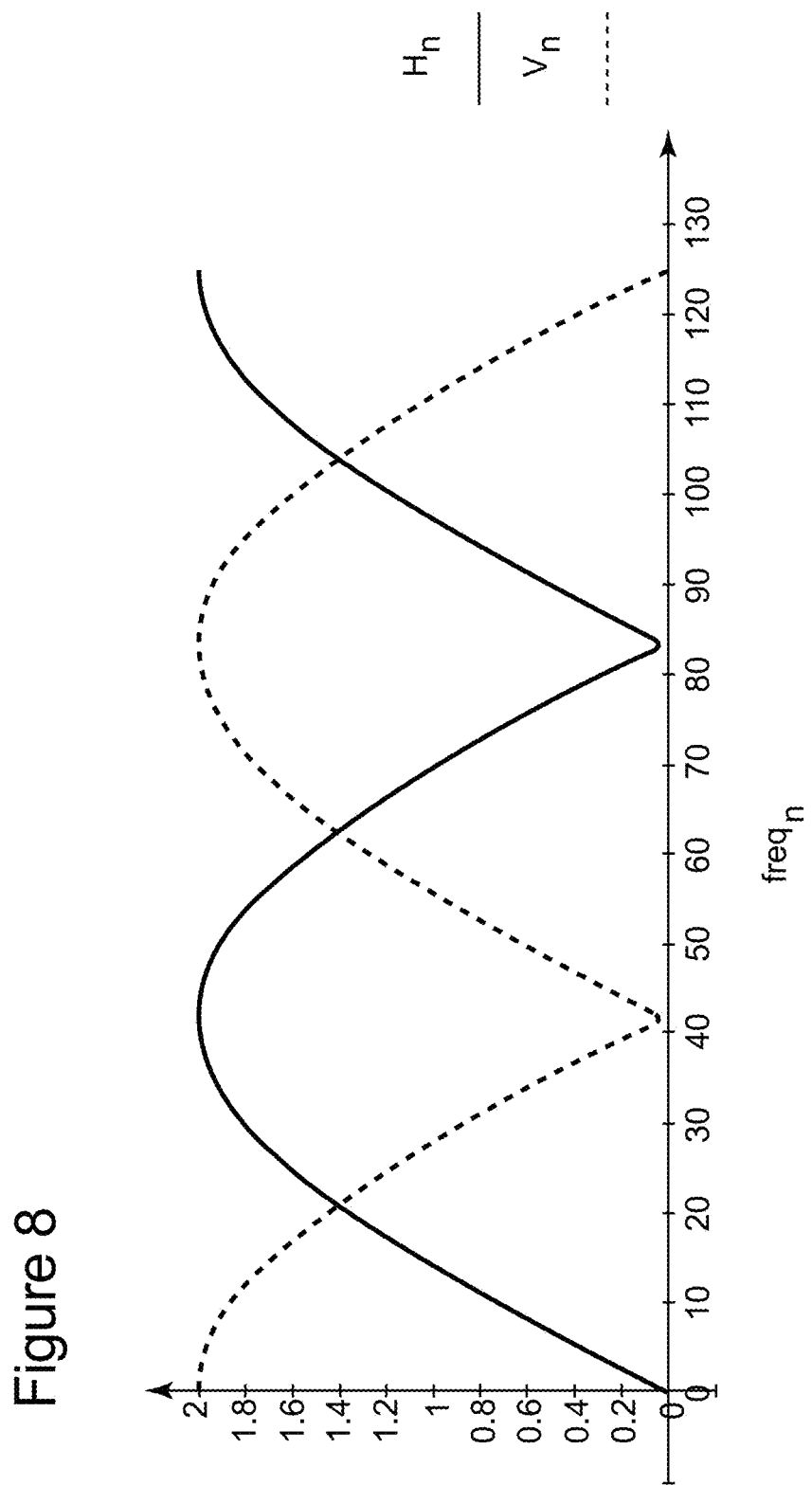
FIG. 8 is a graph illustrating the complementary response of hydrophone data and particle velocity data.

One of skill in the art will appreciate that the method 700 provides a number of benefits and advantages. For example, the ghost-free model (m) must satisfy migration data and mirror migration data generated for both the hydrophone sensors and the particle motion sensors. As shown in FIG. 8, a simulated signal response ($V_n$) for particle velocity data may be greatest at the frequency ($freq_n$ where the signal response for the hydrophone data ($H_n$) is the weakest. Consequently, the ghost peak for the particle velocity data may correspond to the ghost trough for the hydrophone data, and vice versa.

Figure 9:
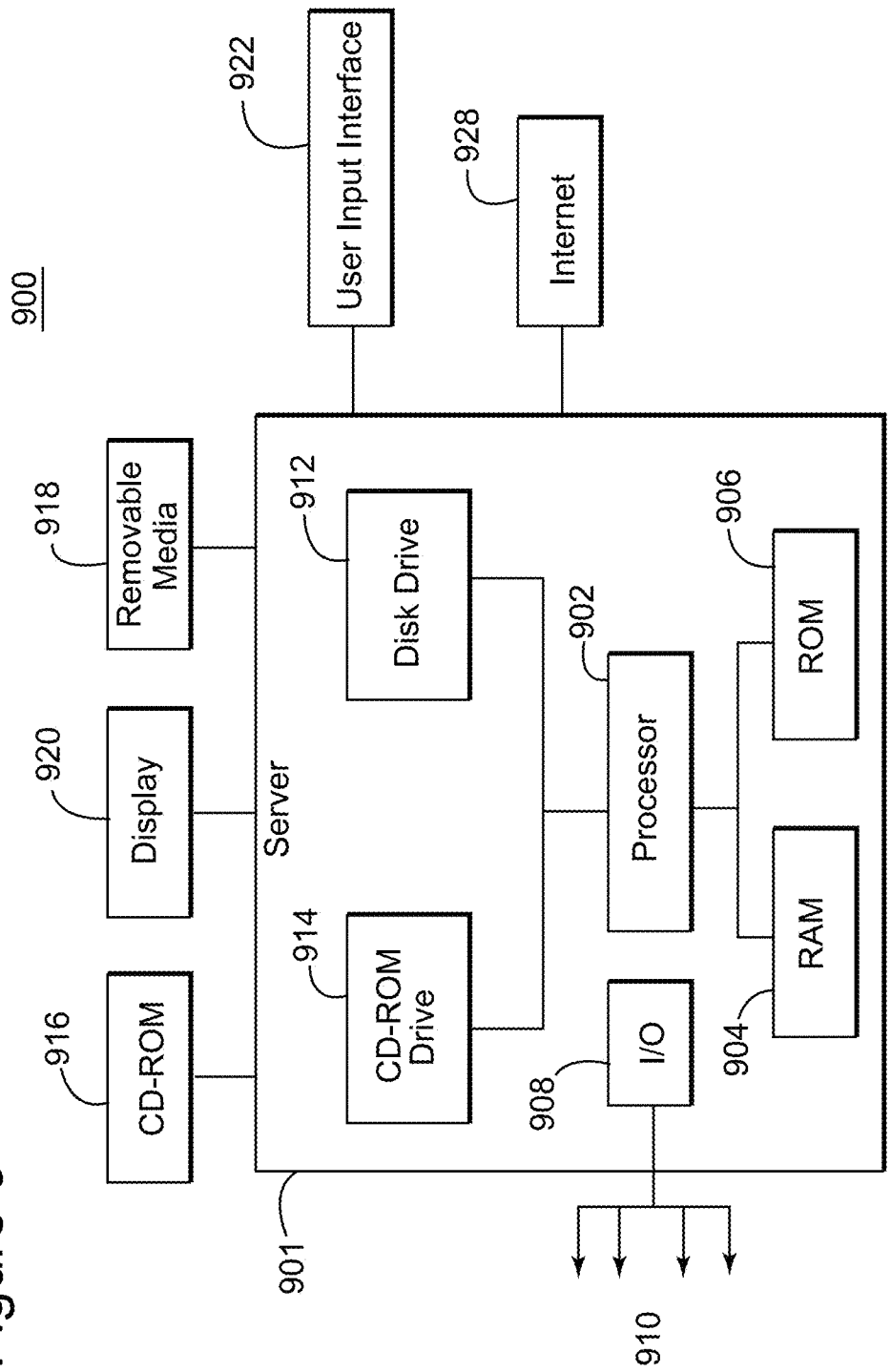
FIG. 9 is a schematic diagram of a computing device configured to implement a de-ghosting method according to an exemplary embodiment.

The above-discussed procedures and methods provide improved results over existing de-ghosting techniques and may be implemented in a computing device illustrated in FIG. 9. Hardware, firmware, software, or a combination thereof may be used to perform the various steps and operations described herein. The computing device 900 of FIG. 9 is an exemplary computing structure that may be used in connection with such a system.

The exemplary computing device 900 suitable for performing the activities described in the exemplary embodiments may include a server 901. Such a server 901 may include a central processor (CPU) 902 coupled to a random access memory (RAM) 904 and to a read only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as are known in the art, as dictated by software and/or firmware instructions.

The server 901 may also include one or more data storage devices, including hard drives 912, CDROM drives 914, and other hardware capable of reading and/or storing information such as DVD, etc. In one embodiment, software for carrying out the above-discussed steps may be stored and distributed on a CDROM or DVD 916, a USB storage device 918 or other form of media capable of portably storing information. These storage media may be inserted into, and read by, devices such as the CDDROM drive 914, the disk drive 912, etc. The server 901 may be coupled to a display 920, which may be any type of known display or presentation screen, such as LCD displays, plasma display, cathode ray tubes (CRT), etc. A user input interface 922 is provided, including one or more user interface mechanisms such as a mouse, keyboard, microphone, touchpad, touch screen, voice-recognition system, etc.

The server 901 may be coupled to other devices, such as sources, detectors, etc. The server may be part of a larger network configuration as in a global area network (GAN) such as the Internet 928, which allows ultimate connection to the various landline and/or mobile computing devices.

The disclosed exemplary embodiments provide a computing device, a method for seismic data processing, and systems corresponding thereto. For example, the disclosed computing device and method could be integrated into a variety of seismic survey and processing systems including land, marine, ocean bottom, and transitional zone systems with either cabled or autonomous data acquisition nodes. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for de-ghosting seismic data related to a subsurface, the method comprising:
    receiving input seismic data corresponding to a plurality of seismic receivers, wherein the input seismic data is in a time-space domain and the seismic receivers are located at different depths ($z_r$), and wherein the input seismic data comprises particle motion data;
    generating migration data (du) and mirror migration data (dd) from the seismic data;
    deriving a ghost-free model (m) based on simultaneously using the migration data (du) and the mirror migration data (dd);

using the ghost-free model to generate a de-ghosted dataset; and generating a final image (f) of the subsurface using the de-ghosted dataset.

2. The method of claim 1, wherein the input seismic data comprises particle velocity data.

3. The method of claim 1, wherein generating the migration data and the mirror migration data comprises correcting for obliquity in a seismic receiver.

4. The method of claim 3, wherein correcting for obliquity comprises applying a scaling factor in conjunction with generating the migration data (du) and the mirror migration data (dd) from the seismic data.

5. The method of claim 1, wherein the input seismic data comprises hydrophone data.

6. The method of claim 5, further comprising:
correcting for obliquity via adaptive subtraction between the particle motion data and the hydrophone data.

7. The method of claim 1 where the migration data is in the offset domain or the angle domain.

8. The method of claim 1, wherein deriving the ghost-free model comprises solving an equation d=Lm for m, where L is a linear operator that incorporates a re-ghosting operation, m is the ghost-free model of the seismic data, and d contains data from the migration data (du) and the mirror migration data (dd).

9. The method of claim 8 where the re-ghosting operation uses a first ghost lag model ($\tau_{gu}$) corresponding to the migration data (du) and a second ghost lag model ($\tau_{gd}$) corresponding to the mirror migration data (dd).

10. The method of claim 9, wherein the first ghost lag model or the second ghost lag model comprises terms corresponding to the particle motion data.

11. The method of claim 10, wherein the first ghost lag model or the second ghost lag model comprises terms corresponding to hydrophone data provided by the plurality of seismic receivers.

12. The method of claim 8, wherein L is defined such that the resulting model (m) is in a domain selected from the group including, but not limited to, a parabolic Radon domain, a linear Radon domain, a FK domain, and a hyperbolic Radon domain.

13. The method of claim 12, further comprising deriving the first ghost lag model ($\tau_{gu}$) or the second ghost lag model ($\tau_{gd}$) by computing a cross-correlation between the migration data (du) and the mirror migration data (dd) and computing an autocorrelation for the migration data (du) or the mirror migration data (dd).

14. The method of claim 8, wherein each element of the operator L comprises a primary event term $e^{-2\pi i f \tau_{pr}}$ and a ghost reflection term $e^{-2\pi i f(\tau_{pr}+\tau_g)}$ where $\tau_g$ is equal to the first or the second ghost lag models.

15. A computing device configured to de-ghost seismic data related to a subsurface, the computing device comprising:
an interface configured to receive input seismic data recorded by a plurality of seismic receivers that are towed by a vessel, wherein the input seismic data is recorded in a time-space domain and the seismic receivers are located at different depths ($z_r$), and wherein the input seismic data comprises particle motion data;
a processor configured to generate migration data (du) and mirror migration data (dd) from the input seismic data;
the processor further configured to derive a ghost-free model (m) based on simultaneously using the migration data (du) and mirror migration data (dd);
the processor further configured to generate a de-ghosted dataset based on the ghost-free model (m); and
the processor further configured to use the de-ghosted dataset to generate a final image (f) of the subsurface.

16. The computing device of claim 15, wherein the input seismic data comprises particle velocity data.

17. The computing device of claim 15, wherein the input seismic data comprises hydrophone data.

18. The computing device of claim 17, wherein the processor is further configured to correct for obliquity via adaptive subtraction between the particle motion data and the hydrophone data.

19. The computing device of claim 15, wherein generating the migration data and the mirror migration data comprises correcting for obliquity in a seismic receiver.

20. A method for processing seismic data related to a subsurface, the method comprising:
receiving migration data (du) and mirror migration data (dd) generated from input seismic data corresponding to a plurality of seismic receivers that are towed by a vessel, wherein the seismic data is in a time-space domain and the seismic receivers are located at different depths ($z_r$), and wherein the input seismic data comprises particle motion data;
deriving a first ghost lag model ($\tau_{gu}$) corresponding to the migration data (du) that estimates a first ghost lag to a seismic source as a function of an offset h of each seismic receiver of the plurality of seismic receivers;
deriving a second ghost lag model ($\tau_{gd}$) corresponding to the mirrored migration data (dd) that estimates a second ghost lag to the seismic source as a function of an offset h of each seismic receiver of the plurality of seismic receivers; and
processing the migration data (du) using the first and second ghost lag models to provide a final image (f) of the subsurface.

* * * * *